(12) United States Patent
Heller et al.

(10) Patent No.: US 6,310,957 B1
(45) Date of Patent: Oct. 30, 2001

(54) METHOD AND APPARATUS FOR INTERDICTING CABLE TELEVISION CHANNELS

(75) Inventors: Michael Wyndham Heller, Carthage; Jack Elden James, Indianapolis; Byron Lynn Johnson, Indianapolis; Ronald Lee Katz, Indianapolis; Stephen Gratzer McWilliams, Greenwood, all of IN (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/964,418

(22) Filed: Nov. 4, 1997

Related U.S. Application Data

(60) Provisional application No. 60/033,936, filed on Dec. 23, 1996.

(51) Int. Cl.[7] .................................................. H04N 7/167
(52) U.S. Cl. ................................................................. 380/236
(58) Field of Search ..................................... 380/236, 238

(56) References Cited

U.S. PATENT DOCUMENTS

| | | | | |
|---|---|---|---|---|
| 4,479,429 | * | 10/1984 | Haryu ................................ | 101/40.1 |
| 5,278,908 | * | 1/1994 | Parikh et al. ........................... | 380/7 |
| 5,289,541 | * | 2/1994 | Schutte et al. ......................... | 380/7 |
| 5,367,269 | * | 11/1994 | Yanagidaira et al. .................. | 331/14 |
| 5,467,397 | * | 11/1995 | West et al. ............................... | 380/7 |

OTHER PUBLICATIONS

Buscombe, Charles G. Television Theory and Servicing, 1985, pp. 1–21.*

* cited by examiner

Primary Examiner—Tod R. Swann
Assistant Examiner—Doug Meislahn
(74) Attorney, Agent, or Firm—Banner & Witcoff, Ltd.

(57) ABSTRACT

Apparatus for interdicting television channels of a cable television system comprises a plurality of oscillators dedicated to jamming the audio portion of television channels to be interdicted, and a further plurality of different oscillators dedicated to jamming the video portion of television channels to be interdicted. The number of jamming oscillators for jamming the audio is less than or equal to the number of jamming oscillators for jamming the video. The hopping rate for video jamming is greatly in excess of the hopping rate for audio jamming. On the other hand, the dwell time for audio jamming is greatly in excess of the dwell time for video jamming. At least two levels of jamming effectiveness of both audio and video portions can be addressably controlled from the headend of a system including such interdiction apparatus. If shared oscillators according to prior art techniques are used to jam both audio and video, this form of jamming engine may be selectively actuated in preference to or as an alternative for a jamming engine comprising both an audio jamming oscillator and a video jamming oscillator.

20 Claims, 10 Drawing Sheets

METHOD AND APPARATUS FOR INTERDICTING CABLE TELEVISION CHANNELS

This application claims priority to U.S. Provisional patent application Ser. No. 60/033,936, filed Dec. 23, 1996, in the names of Michael W. Heller et al. and having the same title.

BACKGROUND OF THE INVENTION

1. Technical Field

This invention relates to the field of cable television systems generally and, more particularly, to a method and apparatus for interdicting cable television channels of a cable television system such that the audio portion of a television channel to be interdicted is effectively jammed as well as the video portion.

2. Description of the Related Arts

So-called interdiction type cable television systems are known, for example, from U.S. Pat. Nos. 4,450,481; 4,651,204 and 4,912,760. These patents are representative only and generally describe a method and apparatus for permitting television channels, including audio and video portions, to be transmitted in the clear (not scrambled) from a central location known as a cable television headend and down a cable to an interdiction unit, typically mounted on a pole or on the side of a cable television subscriber's residence. At the interdiction unit, at least one voltage controlled oscillator hops from cable television channel to cable television channel to jam the television channel in order to deny the subscriber access to the interdicted channels. The remaining channels, including basic service and those the subscriber has paid for, are permitted to pass the interdiction unit in the clear into the subscriber's residence to be viewed on their television set. Because cable television channels are transmitted in the clear, there are no residual artifacts from scrambling and descrambling processes known in the scrambling arts.

In prior art interdiction systems, the jamming carrier is typically placed between the video and audio carriers and transmitted at such an amplitude level to at least deny reception of the video portion of the signal and, to a limited extent, at least, degrade the audio portion. The audio signal jamming is not particularly effective in such systems. A compromise must be reached between jamming the video (more important) and audio portions of the television channel to be interdicted.

The single jamming carrier for jamming both audio and video is permitted to dwell on a particular television channel for a period of time known as the dwell or on time and then hops at a hopping rate to jam other channels that the subscriber is not authorized to receive. Thus, oscillators may be shared among many channels to be jammed. In a simple one oscillator system, as the effectiveness of jamming is increased, the fewer the channels the oscillator has to jam since dwell time inherently increases with decreasing numbers of channels to jam.

On the other hand, these references generally teach that a delicate balance must be maintained between jamming the carrier signal level, the frequency of the jamming carrier and the signal level of an adjacent channel, either immediately above or below the channel to be jammed, so that the adjacent television channel is not adversely impacted by the jamming signal. This phenomenon which is undesirable is known as adjacent channel interference.

Jamming effectiveness is improved the longer the jammer is permitted to dwell on a particular channel. Parikh et al., U.S. Pat. No. 5,278,908, teach principles of addressable interdiction systems and varying the jamming effectiveness and dwell times for different channels depending on their video content sensitivity, for example, violent or sexual content.

None of these systems, including the prior art systems referenced above, have concentrated any attention to audio portion jamming. Audio jamming is performed in these systems at the same time as video jamming and by the same jamming oscillator. The same oscillator that is used for video portion jamming is typically used for audio portion jamming. Consequently, it is still possible, depending on the jamming effectiveness for audio jamming determined by the dwell time, hopping rate, jamming signal location, frequency and amplitude of the jamming carrier, to hear and intelligibly distinguish speech or other audible sounds that may be disturbing to children. Consequently, there remains a need in the art to provide a system, in the first instance, which effectively jams the audible portion of a television signal and, in the second instance, does so without causing adjacent channel interference. Moreover, when the subscriber turns to a jammed channel, the subscriber should not be able to intelligibly distinguish speech or sounds but should be able to listen to an interdicted audio signal which may sound like noise that is not an extremely objectionable sound and does not offend their sensitivity to vulgar or indecent language.

Since conventional interdicting systems are incapable of high level jamming of the audio portion of a television program signal, there remains a need in the art to provide such a system.

SUMMARY OF THE INVENTION

An apparatus for interdicting television channels transmitted in the clear comprises oscillators dedicated to audio signal jamming. A separate audio jamming signal is provided to obtain audio/video parity when a high level of interdiction of both audio and video portions of a television signal is required. Audio programming signals of a television signal are frequency modulated, while the video component of a television program is amplitude modulated. With an FM audio signal, a jamming signal nearer the carrier produces less detected output than one further away (at a 6 dB per octave rate); also, there is no sync information required to produce an audio portion of a television program as there is for a video program. According to the principles of the present invention, if the aural jamming level is properly chosen, the jamming time may be stretched due to the over-driven response of demodulation circuitry. The difference in the amount of time an aural jammer must spend jamming the audio signal may be far longer than that for jamming video. The aural jamming signal can be shared across a fewer number of channels, and the interdiction system for jamming both audio and video may be practically implemented.

The number of audio signal jamming oscillators may be less than the number of video signal jamming oscillators. In one embodiment, a plurality of six (6) megahertz television channels within the bandwidths 120 to 174 megaHertz (for example, nine 6 MHz channels) and between 216 to 552 megahertz (for example, 56 channels) may be jammed, and there are provided four audio signal jamming oscillators and seven video signal jamming oscillators. However, in a preferred embodiment, a maximum of 57 of these 65 channels may be selectively jammed in accordance with addressed communications to the interdiction unit. In the highest level of jamming effectiveness to be referred to herein as H-4, two oscillators total, one audio and one video oscillator, are used to jam four channels. As will be referred to herein, the pair of oscillators will be referred to as one jamming engine that may be individually and addressably controlled from a cable television headend. In the slightly less effective H-7 jamming engine, two oscillators, one audio and one video, are used to jam seven channels. With three such engines comprising a total of six oscillators, then, three times seven or 21 channels can be jammed. One video oscillator is used in the least effective jamming engine referred to herein as the F-12 engine which jams up to twelve possible channels. Three such engines comprising a total of three video oscillators can jam 36 channels, but preferably 30–32 channels, to maintain jamming effectiveness. In each F-12 engine, the prior art practice of jamming both audio and video simultaneously is practiced and will not be further described in detail.

The frequencies of the audio and video oscillators are preferably spaced in a range from 75 kiloHz to 105 kiloHz less than the 4.5 megaHz separation of audio and video carriers in a standard N.T.S.C. system. For PAL, other analog standard definition television systems or in high definition television systems such as Japanese MUSE, the representative frequencies and amplitude suggested herein for audio and video signal jamming will vary. Also, the jamming effectiveness will vary depending on the tolerance levels of different television receiver models and circuitry. Referring to a typical NTSC television channel transmission, for example, as depicted at 47 C.F.R. Section 73.699, FIG. 5, the chrominance or color subcarrier is at a frequency 3.579545 (3.58) MHz "above" the picture or video carrier and the sound center frequency is 4.5 MHz "above" the picture carrier and so "above" and "below" will be used in this application in a similar manner as an analogous reference. In both the H-4 and H-7 engines, the audio jammer is placed between the color subcarrier and the aural carrier and so is "above" the color sub-carrier and "below" the aural carrier. In the high effectiveness relationship, hereinafter referred to as H-4 where both audio and video oscillators are used for jamming, the audio jammer is placed approximately 64 kHz below the 4.5 MHZ audio carrier (4.5 MHz–64 kHz) and the video jammer approximately 11 kHz above the video carrier (video+11 kHz), for a total of 75 kHz. In the less effective H-7 relationship, the audio jammer is likewise placed approximately 64 kHz below the audio carrier and the video jammer is approximately 41 kHz above the video carrier for a total of 105 kHz. Also, in all types of video jamming, the video jammer is allowed to vary by plus or minus 10 kHz and its amplitude between plus 4 and minus 2 dB relative to the video carrier. In either H-4 or H-7, the audio jammer frequency is typically at a much higher amplitude level than the audio carrier frequency it is interdicting. In either H-4 or H-7, the video jammer carrier is typically at a slightly higher to slightly lower amplitude relative to the video carrier frequency it is interdicting. On balance, the amplitude level of respective audio and video oscillators is relatively equal.

Also, in the H-4 high effectiveness relationship, the dwell time on the audio carrier is approximately 1.46 milliseconds (effective pulse width) while the hopping frequency is 155 Hz. For video jamming, the dwell time on the video channel is approximately 89 microseconds (effective pulse width) with a hopping frequency of 2500 Hz. In the H-7 effectiveness relationship, the dwell time on the audio carrier is decreased to 652 microseconds with a hopping rate of 177 Hz. The video dwell time at H-7 is decreased to 39 microseconds and the hopping rate is increased to 2857 Hz.

Because the audio oscillators are slow oscillators and need not be as precise as the video oscillators, less expensive oscillators may be used for the audio jamming oscillators. This leads to the advantage that effective audio portion jamming can be achieved with little or no increase in cost over providing video jamming oscillators alone in accordance with prior art techniques.

These and other features of the present invention will be further described in detail herein with reference to the appended drawings.

BRIEF DESCRIPTION OF THE DRAWINGS

FIGS. 3A–3D also show the components of a conventional jamming oscillator switching arrangement shown in greater detail in FIG. 7a.

FIG. 4 is a frequency plot of a typical television channel to be interdicted where the audio and video carriers are typically separated by 4.5 megahertz.

FIG. 5 shows the oscillator timing for jamming audio and video carriers in the H-4 and H-7 jamming relationships of interest.

FIG. 6 shows the television channel jamming slots for each of the H-4 and H-7 jamming levels, where

DETAILED DESCRIPTION OF THE DRAWINGS

Figure 1:
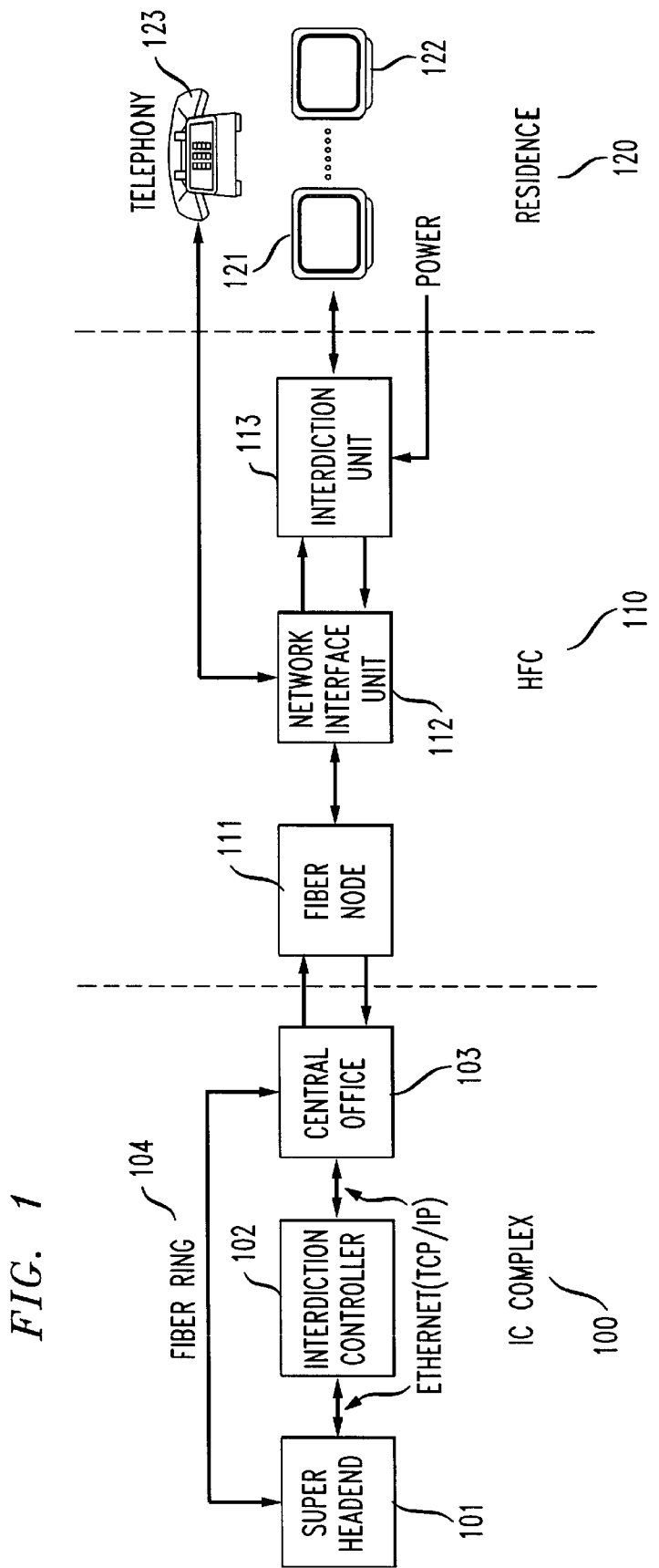
FIG. 1 is a simplified block diagram of an interdiction control system including a fiber ring arrangement, a hybrid fiber coaxial cable distribution system and a typical interdiction unit according to the present invention.

An overview of the interdiction system of the present invention will now be provided with reference to FIG. 1. The exemplary embodiment of the present invention depicted in FIG. 1 anticipates that a hybrid optical fiber/coaxial cable (HFC) distribution plant 110 connects a headend and a subscriber. In the past, distribution plants were typically constructed only of coaxial cable. In the future, optical fiber may be used entirely to connect the headend and the subscriber, permitting a very large bandwidth signal to reach the home. The "super" headend 101 of the present invention is a physical complex from which all television and other programming originates. Signals are obtained through various means such as from satellite reception, broadcast reception or cable reception. The received signals are converted to digital format and provided to an optical fiber ring 104. The ring 104 is accessible to all central offices 103 in a telecommunications serving area. The headend 101 is typically located with an interdiction controller 102 for controlling, for example, access by subscribers to programming provided via the interdiction system.

The interdiction controller 102 is responsible for communicating with the individual interdiction units 113 of the system, of which only one is shown. The respective subscriber channel accesibilities for each subscriber may be updated during these addressed communications. To this end, each interdiction unit 113 is provided with a unique address. In this manner, the premium programming to be jammed, the jamming effectiveness levels, even jammer placements relative to audio or video carriers, may be addressably controlled on a per subscriber basis (or on a group or global address basis). For example, any channels to be jammed, and at what levels of effectiveness of audio/video jamming (H-4, H-7, F-12 or variations thereof), may be addressably controlled from the head end of a cable system according to the present invention. An Ethernet protocol may be used to communicate with the central office 103 where the hybrid fiber coaxial (HFC) distribution network 110 terminates. The central office 103 communicates with a fiber node, only one of which is shown, of the hybrid fiber coaxial network 110. At a fiber node 111, downstream and upstream signals are provided to a network interface unit 112, and to an interdiction unit 113 which may serve one subscriber or serve a closely located group of subscribers.

In an interdiction system, television channels are transmitted in the clear; that is, no jamming signal is applied to the television channel at the headend nor are they scrambled requiring descrambling at the subscriber's premises. In this manner, an interdiction system provides clean signals to the subscriber that are not adversely impacted in any way, except those that are not authorized to a particular subscriber. These will be interdicted at interdiction unit 113, that is, they are jammed by signals generated by jamming oscillators contained within interdiction unit 113. These jamming oscillators can hop from one television channel to another that are not authorized to be received by a subscriber.

The channels to be interdicted are those to which the subscriber is not authorized to receive. These, for example, may be pay or premium television channels or pay-per-view programs that may be jammed on a time-shared basis on a television channel. At the interdiction unit 113, these channels are selectively jammed by interdicting oscillators of a jamming engine to be further described herein. In accordance with the present invention, some of these jamming oscillators are specifically dedicated to jamming the audio portion of a television channel, while others are dedicated to jamming the video portion.

The network interface unit (NIU) 112 provides a telephone interface to a telephone 123 at subscriber residence 120. NIU 112 and interdiction unit 113 may, for example, be mounted on an exterior wall of a premises in the same or separate housings. Power is provided in a conventional manner to power the interdiction unit 113. The interdiction unit 113 is typically mounted outside on a pole or on an exterior wall of the residence 120. A conventional method of providing power to an interdiction unit may be to provide power down the cable from the headend, for example, in the same way that distribution amplifiers (not shown) of the hybrid fiber coaxial cable plant 110 are powered. Authorized television channels in the spectrum, for example, from 54 to 550 MHz are capable of being displayed on television receivers 121 . . . 122 in the subscriber's residence 120. The subscriber can also purchase pay-per-view programs, interactively respond to home shopping requests and perform other tasks by signaling the network interface unit 112 or via a link "up the pole" to the interdiction unit 113, for example, via a radio frequency remote control unit (not shown) or wired link.

Figure 2:
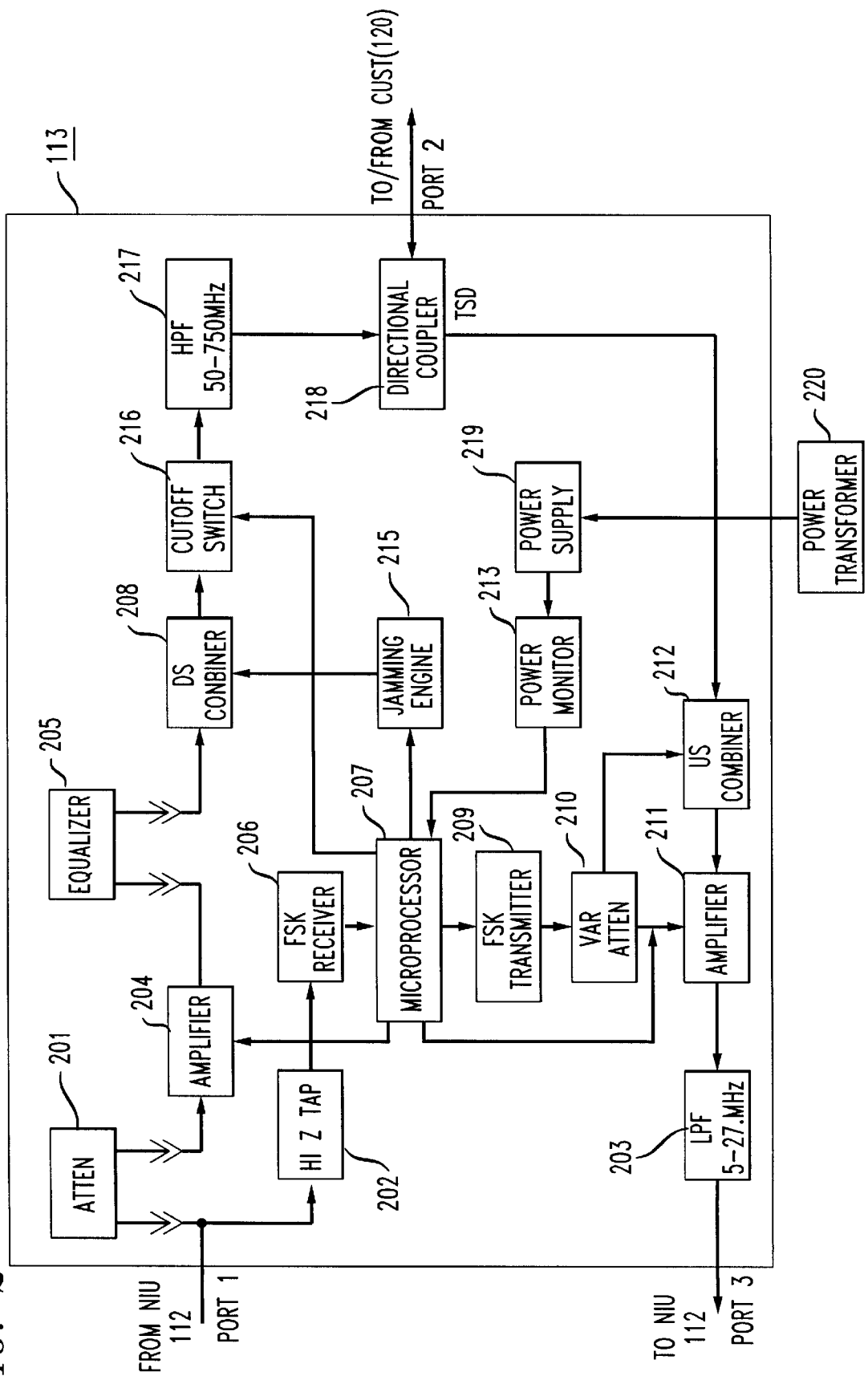
FIG. 2 is a functional block diagram of a typical interdiction unit as shown in simplified form in FIG. 1.

Referring to FIG. 2, interdiction unit 113 will be further described. The interdiction unit components are preferably contained on a single printed wiring board with the exception of the power transformer 220, the board being indicated by a rectangular box. Control signals, for example, frequency shift key signals, are preferably decoupled from the primary feeder coaxial cable via high impedance (Z) tap 202 and applied to frequency shift keying (FSK) receiver 206. Data signals from the FSK receiver 206 are fed to the microprocessor 207 for processing. Upstream control signals are fed by the microprocessor 207 to an FSK transmitter 209 for upstream transmission via attenuator 210, upstream combiner 212, amp 211 and filter 203. The downstream control signals are for channel authorization, jamming effectiveness, subscriber interactivity and other control, and may be globally, group or specifically addressed (per subscriber) to the interdiction unit 113. Also, the return upstream path control signals may contain the address of a polled subscriber interdiction unit 113 and other information.

The television signals received from NIU 112 and transmitted in the clear, are attenuated as necessary at plug-in attenuator 201, amplified at amp 204, and equalized as required by equalizer 205. The output of jamming engine 215 is a combined output of generated jamming signals for jamming the broadband television spectrum received at downstream combiner 208. Unauthorized channels are jammed and all remaining channels are passed in the clear via cutoff switch 216, high pass filter 217 and directional coupler 218 to television receivers at the subscriber's residence 120. The cut-off switch 216 is used to cut off service to a non-paying subscriber. Of course, if the subscriber pays their bills, the cut-off switch 216 remains closed. In an alternative embodiment, if the service provider prefers, the service provider may trap multiple channels at the same time rather than use the cut-off switch to cut off all service, or jam each particular channel when a group of channels can be more simply trapped. The traps can selectively switched in and out of the system by addressable or program control.

It is also possible for a CATV service provider to cut off the actual signals or trap multiple channels at the same time rather than jam the channels. This is done by switching traps into and out of the line for the particular band of channels to be denied (switchable traps not shown)

The jamming unit or jamming engine 215 will be further described in connection with FIGS. 3A–3D. The design of the jamming engine 215 is dependent on the requirements of the particular system operator. On the other hand, it is assumed that some of the channels to be delivered to a subscriber contain undesirable violent or sexually explicit content and inappropriate audio content for children. According to the present invention, a number of oscillators may be used for video jamming and a lesser or equivalent number for audio jamming depending on the effectiveness level desired. For high jamming effectiveness, for example, four oscillators 320–323 are dedicated to audio signal portion jamming. One of these is used for H-4 level jamming and the other three for H-7 level jamming. The audio oscillators share the same controller, microprocessor #1 300, digital to analog converter 310, and audio oscillator multiplexer 315. Seven oscillators 340–346 are dedicated to jamming the video portion of the signal. The video oscillators share the same controller, microprocessor #2 305, digital to analog converter 330 and video oscillator multiplexer 335. The oscillators are frequency controlled in a conventional manner and periodically calibrated via a feedback loop including calibrator 350. The video oscillators comprise one oscillator 340 for H-4 level jamming, three oscillators 341–343 for H-7 level jamming, and three more are used for F-12 level jamming (without separate audio jamming as will be further explained herein).

Figure 7A:
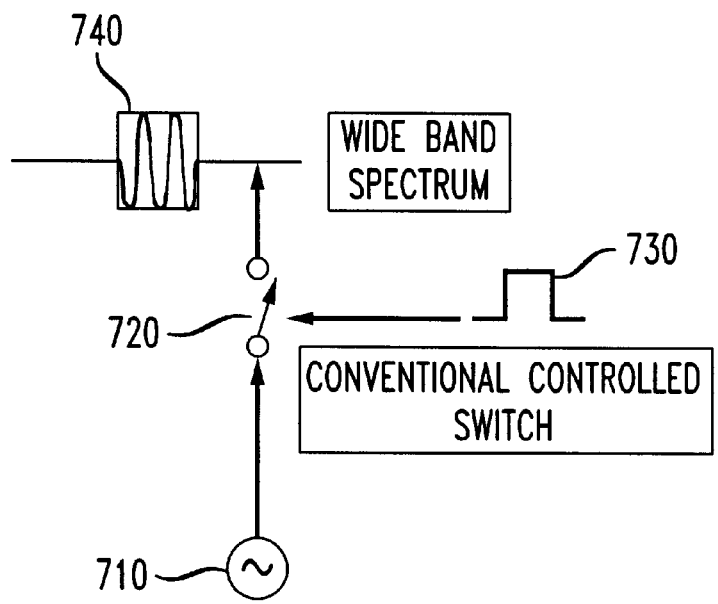
FIG. 7(a) represents conventional jamming oscillator switching and FIG. 7(b) suggests the introduction of a time-varying current pulse via a mixer for introducing the jammer into an interdicted spectrum.

The act of hopping from channel-to-channel can introduce sidebands around the jamming signals which were conventionally controlled by filtering. As will be described in connection with FIG. 7, the spectrum of the output signal for combination with other signals may be shaped without extensive use of filters by introducing a shaped current pulse. The reference to FIG. 7 shows an oscillator input to a mixer shaped by a spectrum control waveform which will be further described herein.

Figure 3A:
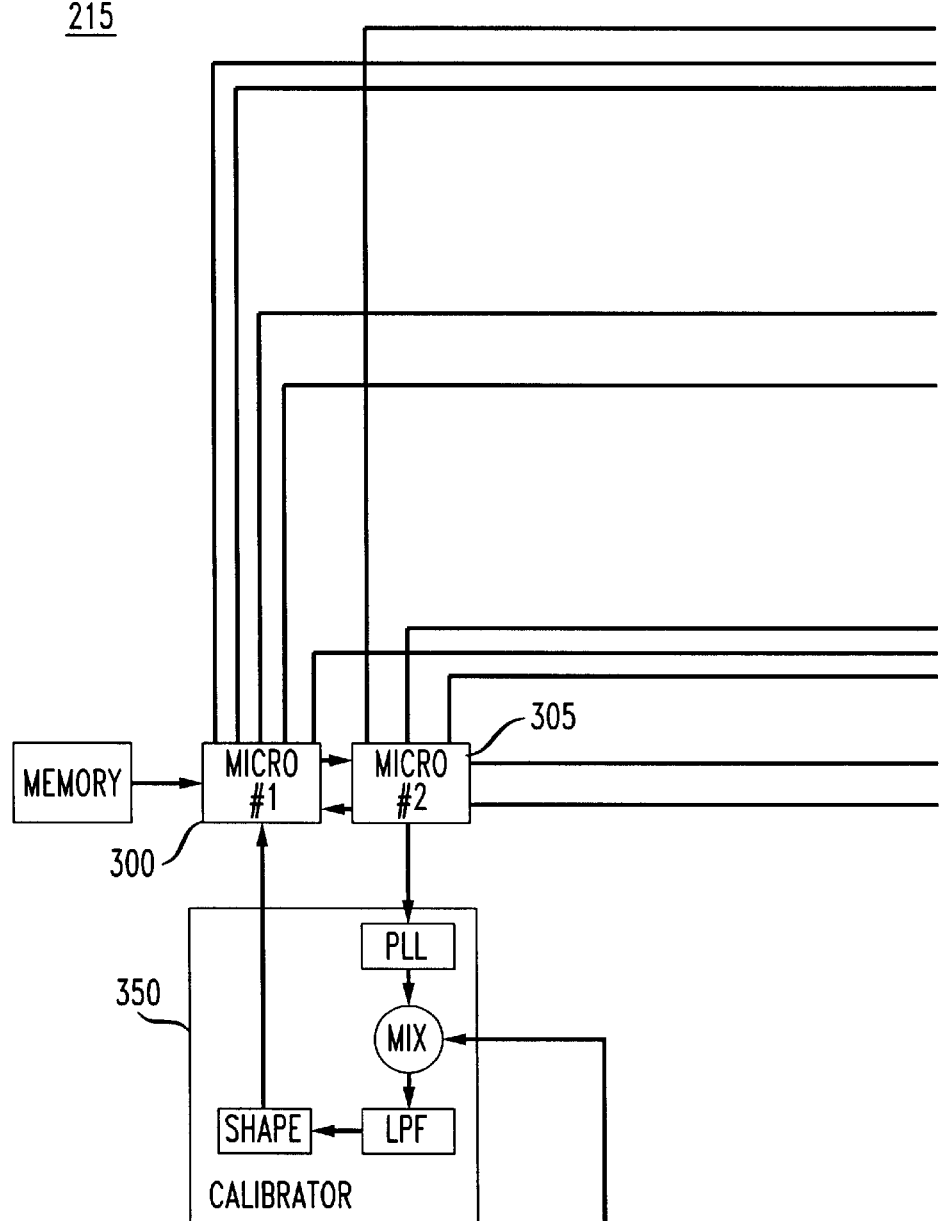
FIGS. 3A–3D provide particular detail of the jamming engine of the interdiction unit of FIG. 2 showing four audio jamming signal oscillators and seven video jamming signal oscillators for separately interdicting the audio and video portions, respectively, of a television channel to be interdicted (that is, the subscriber is not entitled to receive).
Figure 3D:
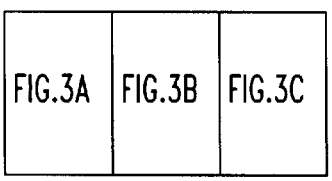
Figure 3B:
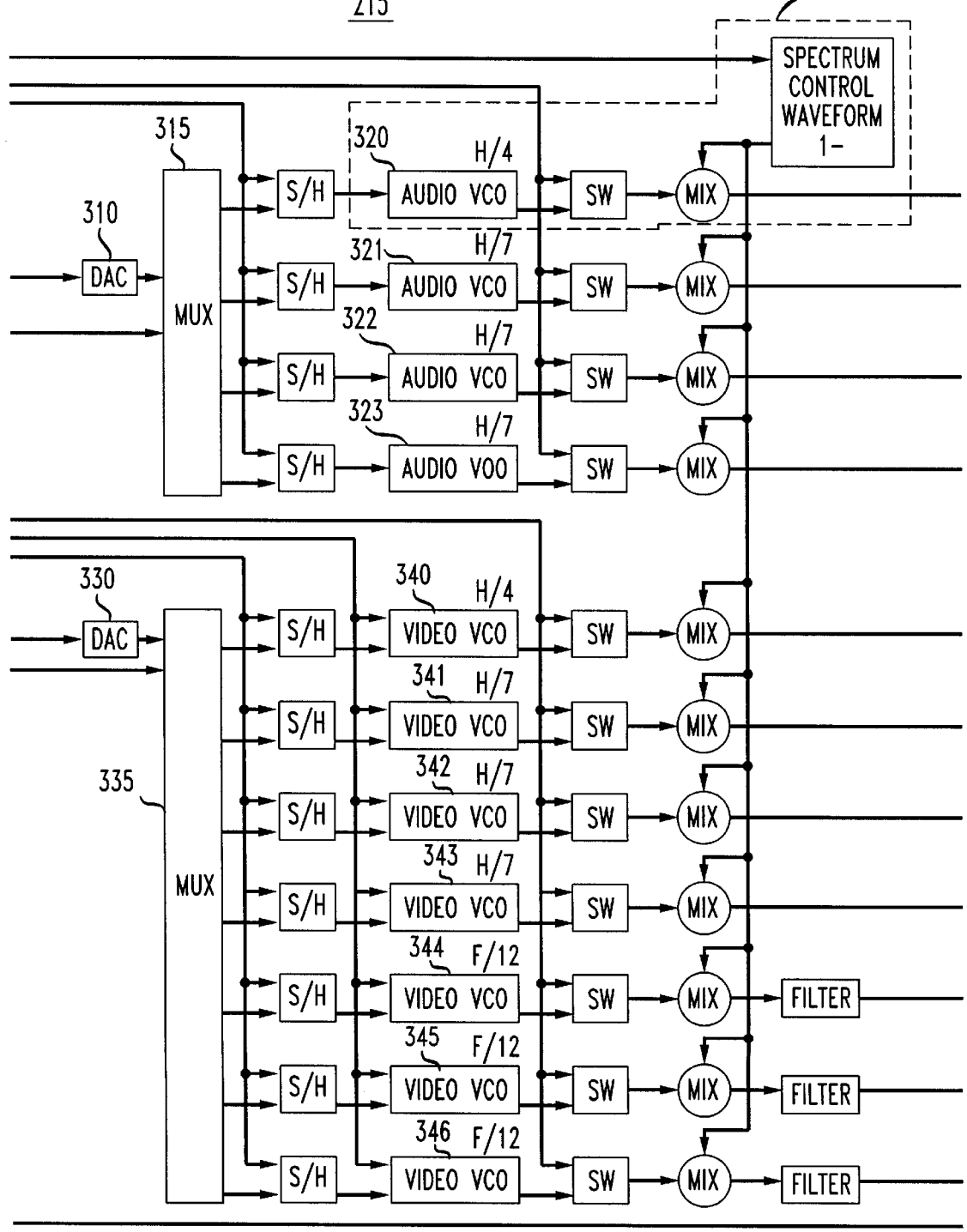

Additionally, FIG. 3B shows oscillators dedicated separately to audio and video jamming. In an alternative embodiment, to be described in connection with FIG. 8, a single mixer and low pass filter can be used to achieve band pass selectivity for audio and video jamming.

The total of eleven oscillators of FIG. 3B are functionally allocated among several possible jamming effectiveness scenarios, two of which, H-4 and H-7, involve simultaneous audio and video portion jamming of an interdicted television channel. The highest level of jamming effectiveness, or the most jamming, can be provided over four channels (hence, the H-4 designation). The next, less effective level of jamming is represented by H-7. Each jamming engine of an H-7 engine comprises one audio and one video oscillator, and can jam as many as 7 channels. Three such engines can jam three times seven, or as many as 21 television channels simultaneously. The lowest level of jamming effectiveness, referred to herein as a conventional F-12 level, jams a maximum of 36, preferably a maximum 30–32, channels without dedicated audio jamming oscillators, and depending on how the channels are spaced in a given band of frequencies.

In summary, the jamming engine provides the appropriate interdicting signals to simultaneously jam up to 57 of the 65 NTSC cable television channels in the 54 to 550 MHz frequency range, or could be adapted to jam other video formats such as PAL or SECAM. There is one H-4 jamming engine for jamming up to four channels at the highest jamming level. There are three H-7 jamming engines for jamming up to seven channels each or a total of up to 21 channels. The 3 F-12 engines jam a total of 36 channels, and, in one embodiment 32 channels. Each jamming engine is comprised of analog radio frequency and digital control circuits.

Techniques H-4 and H-7, which provide simultaneous video and audio interdiction, utilize two separate unmodulated carriers superimposed on the TV RF spectrum. The two frequencies of these jamming signals are individually chosen to be maximally effective for jamming one specific parameter of the television channel (one signal for jamming the video and one signal for jamming the audio).

Two oscillators, one audio selected from available audio jamming oscillators 320–323 and one video selected from available video jamming oscillators 340–346, are used in each H-4 jamming engine, which jams up to four channels. The channels interdicted by this engine are completely masked; that is, both video and audio portions of the interdicted television channel tuned to on a receiver 121, 122 are thoroughly unintelligible.

Also, two oscillators, one audio and one video, are used in each H-7 jamming engine which jams seven television channels. The television channels interdicted by this engine have severely jammed video and essentially unintelligible audio. Three such H-7 engines are required to jam 21 television channels.

Together in this exemplary embodiment, there are at least two levels of jamming effectiveness for both audio and video jamming that are selectively addressable. Moreover, the headend may select from at least one engine comprising both an audio oscillator and a video oscillator; and an engine that has to share an oscillator (the F-12 engine). Via headend control, H-4 may be applied to a program having especially violent or sexually explicit content and H-7 to a program having slightly less violent content. Also, the headend could select an H-4 or H-7 engine for heavy audio jamming, and an F-12 engine that hardly jams the audio at all. Program previews may be passed by the interdiction unit 213 in the clear.

In addition to having two separate and distinct jamming signals for audio and video, the time and frequency allocation of these signals are different, and designed specifically to impart the most effective jamming. Since the oscillators are time-shared, to minimize the number of oscillators required, the time-share profile is important to the performance of the interdiction unit. As will be further described herein, there is an optimum jamming signal duty cycle (dwell time/hopping rate) which is dramatically different for the video jamming signal and the audio jamming signal. In general, the duty cycle and on-time duration of the audio specific jamming signal is greater than that of the video specific jamming signal. Stated another way, the audio oscillator is preferably slower and less precise in frequency and may be a less expensive oscillator than a video oscillator. For example, the jamming frequency of the audio jamming oscillator may jam at a hopping rate of less than one tenth the hopping rate of the jamming frequency of the video jamming oscillator. Alternately, the jamming frequency of the audio jamming oscillator may dwell on the audio portion of the interdicted television channel more than ten times longer than the jamming frequency of the video jamming oscillator dwells on the video portion of the interdicted television channel.

On the other hand, amplitudes of the audio jammer must be maintained so as to not interfere with the video carrier of the immediately higher adjacent television channel. Similarly the video jammer should not be at an amplitude that would adversely impact the audio carrier of the immediately lower adjacent television channel. In this manner, adjacent channel interference is minimized. If, for example, a square wave switching function is used to turn on and off the jamming signals, to allow oscillator sharing and to mute the jamming signal outputs when they are changing frequencies, adjacent channel interference will occur. In this case, the spectrum of the jamming signal follows the sin x/x distribution. For values of x represented by the adjacent lower channel, the function value is sufficiently large to cause interference. The control of the switching engine is performed by using a double balanced modulator in a current driven mode. The shape of the current waveform controls the spectrum of the switched oscillators and is specifically tailored to minimize adjacent channel interference control.

Finally, the audio jamming frequency, hopping rate and amplitude and frequency offset from the audio carrier, must be selected as to not sound subjectively negative to a subscriber. The tones, if at all possible, should sound relatively pleasant and certainly not offensive to the listener.

Each oscillator, audio or video has a pre-defined frequency range within which it must operate. Based on the frequency range, appropriate filtering is used to control the harmonic spectral purity as is known in the art.

Figure 3C:
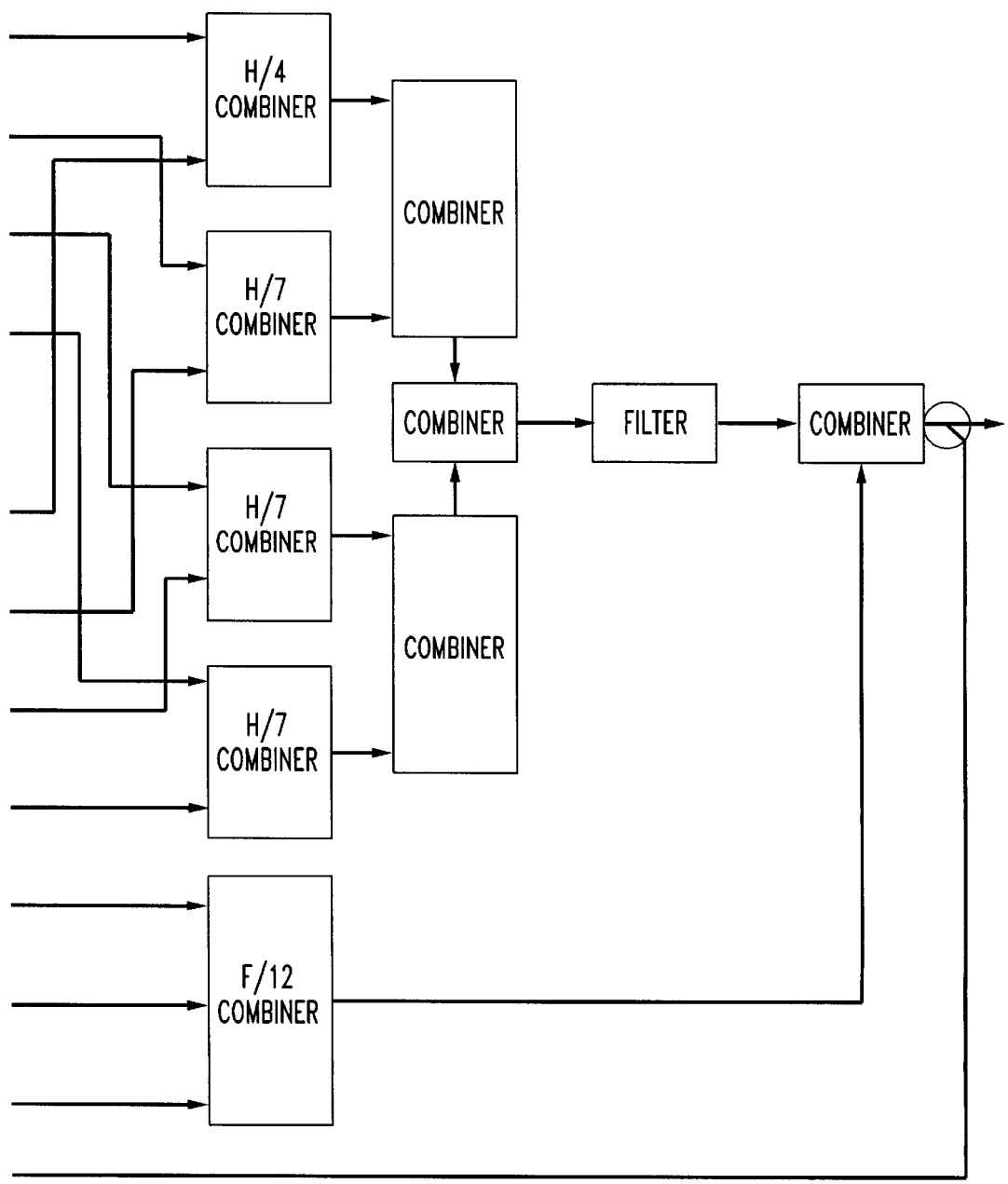

The jamming signals are passively combined via the plurality of combiners shown in FIG. 3C, and then combined with the downstream video channels via the downstream combiner 208 (FIG. 2) for delivery to the subscriber at residence 120.

The timing, frequency and amplitude and other parameters for separate and simultaneous audio and video signal jamming will be more particularly described with reference to FIGS. 4 and 5.

Figure 4A:
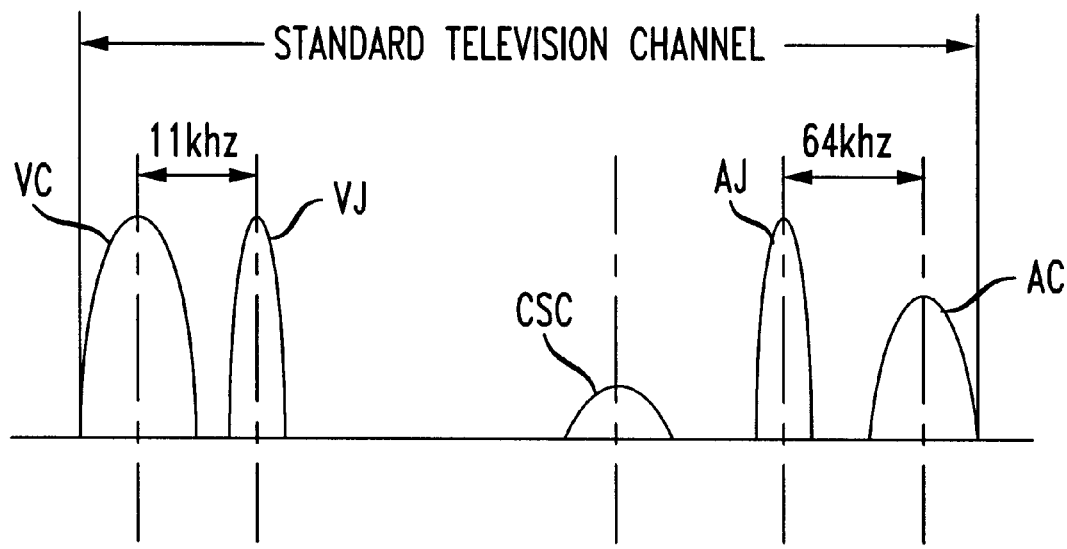
FIG. 4A shows the H-4 arrangement for separately jamming audio and video.

Referring now to FIG. 4A, the frequency offset versus amplitude relationships of the jamming oscillators for audio and video are shown relative to the audio and video carriers of a typical television channel to be jammed. FIG. 4A represents H-4, a high level of jamming effectiveness. The frequencies and relative levels shown are merely exemplary and should not be construed to be limiting as to the present invention. The audio carrier AC is the peak at the right and the video carrier VC is the high peak at the left of the frequency plot of FIG. 4A. The color subcarrier CSC, in an NTSC system at 3.58 MHz, is shown as a small peak in between the video carrier VC at the left and the audio carrier AC at the right. Also, in an NTSC system, the video and audio carriers are separated by 4.5 MHZ.

Referring to the audio carrier AC amplitude level, it can be seen to be between the amplitude of the color subcarrier CSC and the video carrier VC. The audio carrier AC is much lower in amplitude than the level of the audio jamming frequency AJ placed just 64 kHz below the audio carrier. The video jamming signal VJ, on the other hand, is at approximately the same level as the video carrier VC and the audio jammer AJ. The video jamming signal may be placed 11 kHz above the video carrier in the H-4 engine. The total frequency offset from normal 4.5 MHz offset is 75 kHz (11+64). Preferably, the video jammer VJ is allowed to vary in amplitude and frequency in relation to the video carrier VC. The variation improves jamming and thwarts pirate attempts to insert a notch filter to eliminate a fixed jammer frequency location.

Figure 4B:
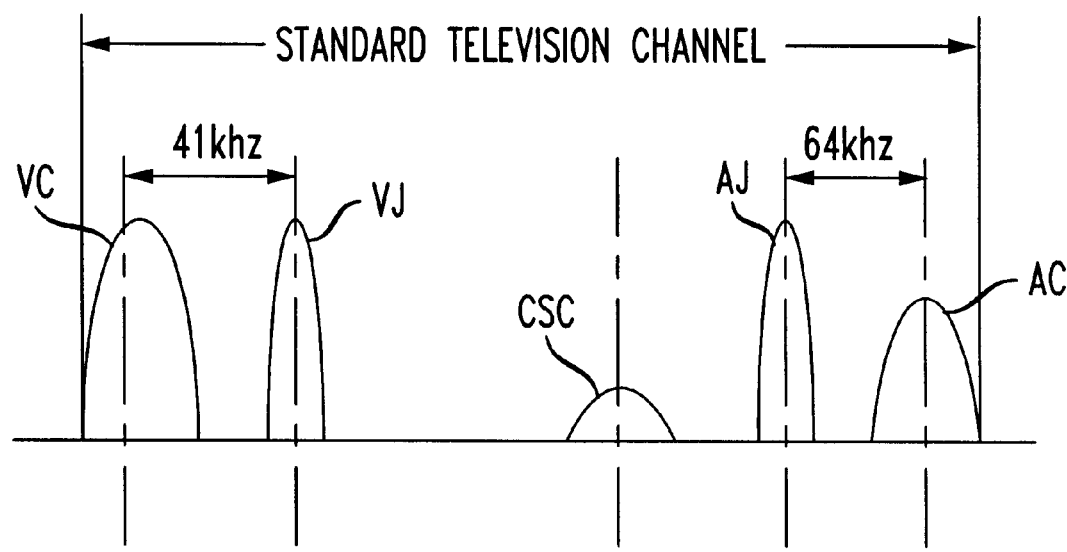
FIG. 4B shows the H-7, less effective jamming relationship.

Referring now to FIG. 4B, there is shown the frequency offset and amplitude relationships for H-7, a slightly less effective jamming effectiveness than H-4. As in FIG. 4A, one audio and one video oscillator are used. The amplitude of the audio jammer AJ is at a much higher amplitude in comparison with the audio carrier AC, and the video jammer VJ is at approximately the same amplitude or slightly higher in comparison with the amplitude of the video carrier VC. The audio jammer AJ is placed 64 kHz below the audio carrier AC and 856 kHz above the color sub-carrier CSC. The video jammer VJ is (in contrast to FIG. 4A) is placed 41 kHz above the video carrier VC. The video jammer VJ is allowed to vary by plus or minus 10 kHz and its amplitude by plus 4 to minus 2 dB from nominal. In this manner, and from experience with a large number of makes and models of television receivers, most television receivers have been found to exhibit effective jamming.

In both H-4 and H-7, the video jammers VJ are placed closer to the video carriers VC than to the color sub-carrier CSC. Also, the audio jammers AJ are placed closer to the audio carriers AC than to the color sub-carrier CSC. An adjacent television channel would appear either to the left, to the right or on both sides of the signals depicted in FIGS. 4A and 4B, and have the same format. In any channel, the video and audio jammers will appear internally to the 4.5 MHZ bandwidth of the television channel (NTSC). Similar jammer spacings and amplitudes may be appropriate for certain PAL formats, SECAM or other known television signal formats including the MUSE high definition television signal format used in Japan.

Figure 5A:
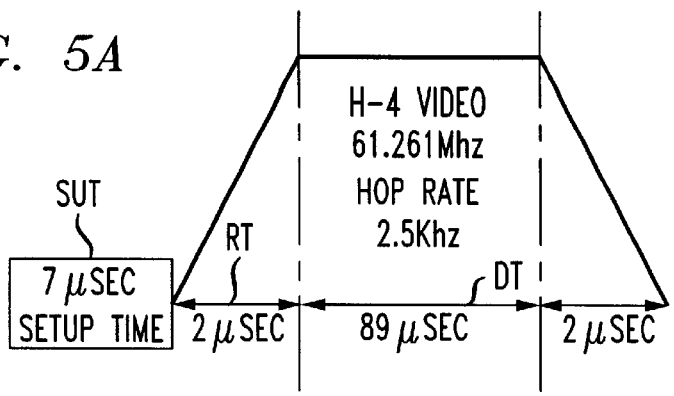
FIG. 5A represents H-4 video.
Figure 5B:
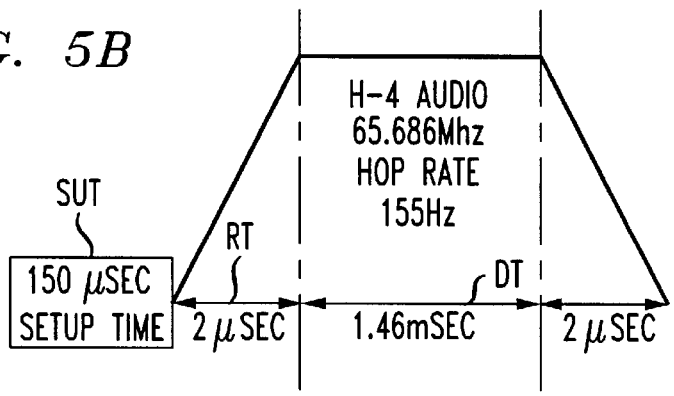
FIG. 5B represents H-4 audio.

Referring now to FIGS. 5A to 5D, the parameters will be more particularly described for the H-4 and H-7 jamming effectiveness levels for an NTSC signal by way of example, FIGS. 5A and 5B relate to H-4. In FIG. 5 and referring to FIG. 5A by way of example, a time slot for each jammed channel audio or video portion is represented showing a set-up time (SUT) for allowing the oscillator to stabilize at a new channel jamming frequency; a rise time (RT) for allowing the oscillator to achieve a predetermined amplitude level at the jamming frequency; an on time or dwell time (DT) where the jamming frequency is applied to jam the television channel, and a fall time (FT) where the amplitude falls to zero again. A new set-up time begins a next cycle and the process of hopping repeats. The video set-up time (SUT) is 7 $\mu$s and the audio set-up time (SUT) is 150 us, so a slower oscillator can be used for audio jamming. The rise time (RT) and fall time (FT) are the same, 2 us. FIGS. 5A and 5B relate to H-4 jamming, and FIGS. 5C and 5D relate to H-7.

Referring first to FIG. 5A, there is shown video oscillator timing for an H-4 video oscillator shown in FIG. 3B. The H-4 video oscillator frequency for channel 3 is 61.261 MHz with a total on time of 89 microseconds. The hop rate that it hops from one interdicted channel to the next is 2.500 kHz. It takes 7 microseconds for the oscillator to set-up at a particular frequency, the "set-up time." And, there are two microsecond rise and fall times from maximum amplitude once the oscillator reaches the frequency of the video portion of the television channel to be jammed. Thus, the 89 $\mu$sec on time is calculated by subtracting two 2 $\mu$sec rise or fall times and a 7 $\mu$sec set-up time for a total of 11 $\mu$secs from a 100 usec possible on time based on the hop rate.

Referring to FIG. 5B, there is shown the audio oscillator timing for an audio interdicting oscillator at H-4 jamming effectiveness. The H-4 audio oscillator frequency for channel 3 is 65.686 MHz, with an on time of 1.46 milliseconds and a hop rate of 155 Hz. The on time takes into account 150 microseconds of set-up time. As indicated above, the rise and fall times are just 2 microseconds.

Figure 5C:
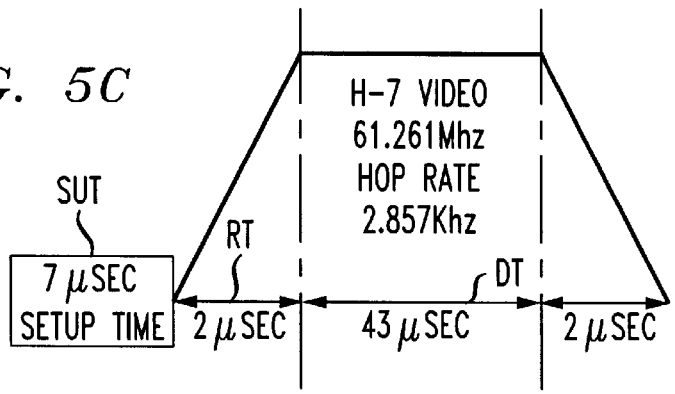
FIG. 5C represents H-7 video.

Referring now to FIG. 5C, there is shown the video oscillator timing for an H-7 video oscillator. The H-7 video oscillator frequency for channel 3 is 61.261 MHz, with an on time of 43 microseconds and a hop rate of 2.857 kHz assuming 7 microseconds for set-up time. Also, 2 microseconds of rise and fall time are anticipated.

Figure 5D:
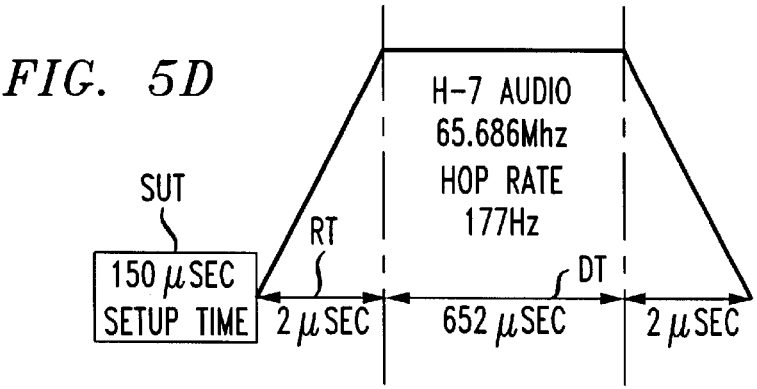
FIG. 5D represents H-7 audio.
Figure 6A:
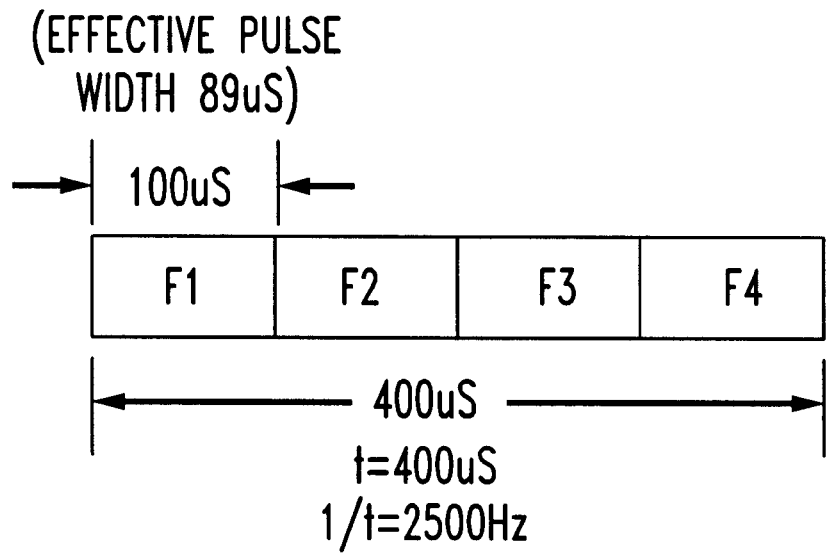
FIG. 6A represents H-4 video jamming.
Figure 6B:
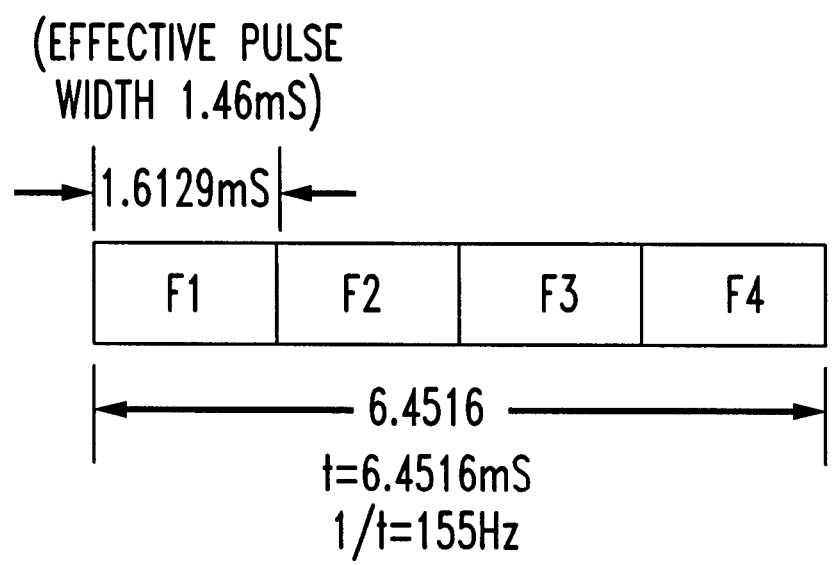
FIG. 6B represents H-4 audio.
Figure 6C:
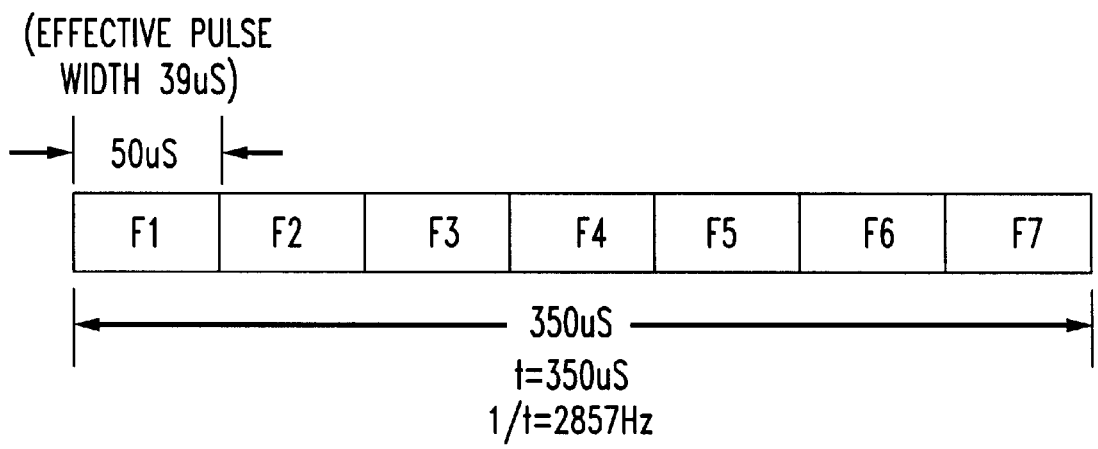
FIG. 6C represents H-7 video and FIG. 6D represents H-7 audio.
Figure 6D:
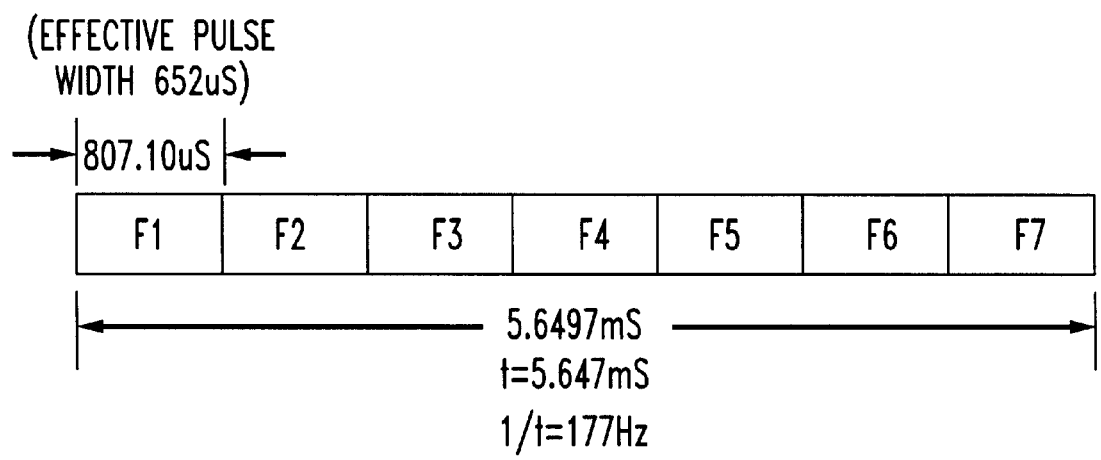

Referring now to FIG. 5D, there is shown the audio oscillator timing for an audio oscillator interdicting at H-7 jamming effectiveness. The H-7 audio oscillator frequency for channel 3 is 65.686 MHz, with an on time of 652 microseconds and a hop rate of 177 Hz. The on time takes into account approximately 150 microseconds of set-up time. Also, two microseconds of rise and fall time are assumed.

In general, then, the preferred hop rates for audio jamming are much slower than the hop rates for video and are in the range of 50–250 Hz. The comparable video hop rates (including the F-12 engine) are in the range of 2 kHz to 5 kHz.

Now referring to FIGS. 6, there are shown the time slots for H-4 and H-7 in more particular detail showing the four channels F1–F4 for H-4 and seven channels F1–F7 for H-7. The general formula for calculating the effective pulse slot is equal to the timeslot pulsewidth minus the rise time, fall time, and set-up time. In FIG. 6A, for example, for H-4 video, the total time slot per channel assuming a 2500 Hz hop rate is 100 $\mu$S (400 $\mu$S/4). However, one subtracts two 2 $\mu$sec rise and fall times, and a 7 $\mu$s set-up time to get 89 usec for an effective jammer pulse width when the jammer is at full amplitude. FIGS. 6B–6D show the same parameters as described above for H-4 audio, H-7 video and H-7 audio, respectively. FIG. 6B, for example, shows how t=6.4516 mS for H-4 audio and, when divided by four channels, provides a per channel slot of 1.6129 mS. After subtracting out SUT, RT and FT, the effective pulse width is 1.46 mS.

Figure 7B:
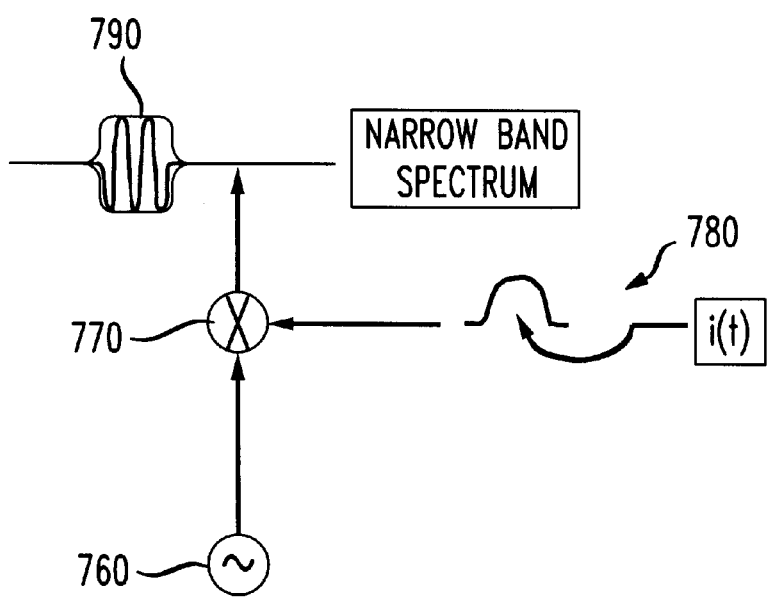
FIG. 7 represents a schematic drawing of circuitry for spectrum shaping introduced in the discussion of FIGS. 3A–3D, where

Referring now to FIG. 7, the details of spectrum waveform control will be described in greater detail which were first introduced in FIG. 2. FIG. 7(*a*) relates to conventional switching 720 of the output of a jamming oscillator 710 introduced into a wideband spectrum 740. The conventional switch is operated by a square pulse 730. This process introduces sidebands around the jamming signals which are undesirable and typically controlled by filtering. According to the invention of FIG. 7(B), a shaped current pulse i(t), which continuously varies with time, for example, a sine wave or more shaped-at-the edges pulse 780 as shown, is introduced at a mixer 770 for mixing with the jammer from oscillator 760. The resultant spectrum 790 requires no filtering and introduces minimal sidebands. The conventional double balanced diode mixer 770 acts as a current controlled attenuator, with the bandwidth controlling current waveform 780 applied to the D.C. coupled intermediate frequency mixer port.

While one embodiment has been shown and described of a method and apparatus for jamming audio and video portions of a television channel, the above-described embodiment may be varied by one of ordinary skill in the art depending on any number of design considerations which are variable from system-to-system. All United States patents referenced herein, should be deemed to be incorporated by reference for teachings of known practices in the design of related cable television systems such as addressability and control, return path design, oscillator frequency and amplitude control, and the like. The present invention should only be deemed to be limited by the scope of the claims which follow.

What we claim is:

1. Apparatus for interdicting television channels of a cable television system comprising:

a plurality of oscillators for jamming audio portions of television channels to be interdicted and a plurality of different oscillators for jamming video portions of the television channels to be interdicted, said plurality of video oscillators being greater in number than said plurality of audio oscillators, such that a jamming frequency of an audio jamming oscillator jams at a hopping rate of less than one tenth of a hopping rate of a jamming frequency of a corresponding video jamming oscillator.

2. Apparatus according to claim 1 wherein an amplitude of the jamming signal from the video jamming oscillator varies by plus 4 to minus 2 dB from nominal.

3. Apparatus for interdicting television channels of a cable television system comprising:

a plurality of oscillators for jamming audio portions of television channels to be interdicted and a plurality of different oscillators for jamming video portions of the television channels to be interdicted, said plurality of video oscillators being greater in number than said plurality of audio oscillators, such that a jamming frequency of an audio jamming oscillator dwells on an audio portion of a television channel to be interdicted more than ten times longer than a jammming frequency of a video jamming oscillator dwells on a video portion of the television channel to be interdicted.

4. Apparatus for interdicting television channels of a cable television system comprising:

a plurality of oscillators for jamming audio portions of television channels to be interdicted and a plurality of different oscillators for jamming video portions of the television channels to be interdicted, said plurality of video oscillators being greater in number than said plurality of audio oscillators, such that a jamming frequency of a video jamming oscillator corresponding to the video portion of the television channel to be interdicted varies plus or minus ten kilohertz.

5. Apparatus according to claim 4 wherein a jamming signal of a video jamming oscillator has a jamming frequency between a video carrier signal frequency and an audio carrier signal frequency of a television channel to be interdicted and in the range of 10 kHz to 50 kHz from the video carrier signal frequency.

6. Apparatus according to claim 4 wherein a jamming signal of an audio jamming oscillator has a jamming frequency in the range of 25 kHz to 75 kHz below a frequency of an audio portion of a television channel to be interdicted.

7. Apparatus according to claim 4 wherein jamming signal of an audio jamming oscillator has an amplitude approximately equal to or less than an amplitude of a corresponding jamming signal from a video jamming oscillator.

8. Apparatus for interdicting television channels of a cable television system comprising a plurality of oscillators for jamming audio portions of television channels to be interdicted and a plurality of different oscillators for jamming video portions of the television channels to be interdicted, said plurality of video oscillators being greater in number than said plurality of audio oscillators, such that a frequency of at least one audio carrier jamming signal is offset from a frequency of an associated video carrier jamming signal by greater than 4 and less than 4.425 MHz.

9. Apparatus according to claim 8 wherein a jamming frequency of an audio jamming oscillator jams at a hopping rate of less than one tenth of a hopping rate of a jamming frequency of a corresponding video jamming oscillator.

10. Apparatus according to claim 8 wherein a jamming frequency of an audio jamming oscillator dwells on an audio portion of a television channel to be interdicted more than ten times longer than a jamming frequency of a video jamming oscillator dwells on a video portion of the television channel to be interdicted.

11. Apparatus according to claim 8 wherein the offset is in the range of 4.395 to 4.425 MHz.

12. Apparatus according to claim 8 wherein at least one of the audio and video jamming oscillators produces a jamming signal with an amplitude that is greater than or equal to a respective amplitude of the audio or video carrier to be interdicted.

13. Apparatus according to claim 8 wherein a jamming frequency of a video jamming oscillator corresponding to a video portion of a television channel to be interdicted varies over a predetermined range.

14. Apparatus according to claim 13 wherein the jamming frequency of the video jamming oscillator corresponding to the video portion of the television channel to be interdicted varies plus or minus ten kilohertz.

15. Apparatus according to claim 8 wherein an amplitude of a jamming signal from a video jamming oscillator varies over a predetermined range in relation to a video carrier signal of a television channel to be interdicted.

16. Apparatus according to claim 15 wherein the amplitude of the jamming signal from the video jamming oscillator varies by plus 4 to minus 2 dB from nominal.

17. Apparatus according to claim 8 wherein at least one audio jamming oscillator and at least one video jamming oscillator are arranged together to form a jamming engine.

18. Apparatus according to claim 8 wherein a jamming signal of a video jamming oscillator has a jamming frequency between a video carrier signal frequency and an audio carrier signal frequency of a television channel to be interdicted and in the range of 10 kHz to 50 kHz from the video carrier signal frequency.

19. Apparatus according to claim 8 wherein a jamming signal of an audio jamming oscillator has a jamming frequency in the range of 25 kHz to 75 kHz below the audio carrier signal frequency of a television channel to be interdicted.

20. Apparatus according to claim 8 wherein jamming signal of an audio jamming oscillator has an amplitude approximately equal to or less than an amplitude of a corresponding jamming signal from a video jamming oscillator.

\* \* \* \* \*